Figure 1:
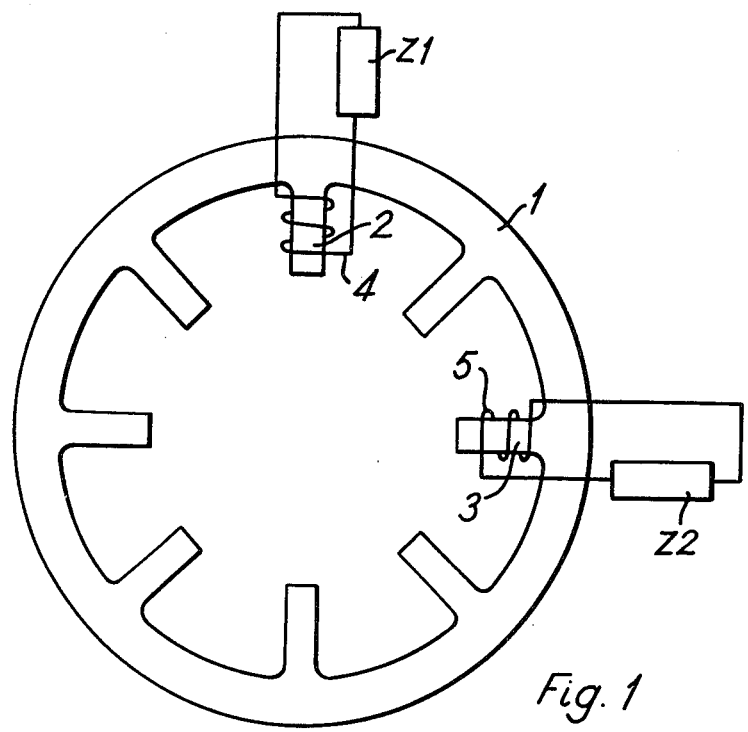

United States Patent [19]

Lawrenson et al.

[11] 4,100,473
[45] Jul. 11, 1978

[54] ELECTRIC STEPPER MOTORS

[75] Inventors: Peter John Lawrenson; Austin Hughes, both of Leeds, England

[73] Assignee: National Research Development Corporation, London, England

[21] Appl. No.: 728,732

[22] Filed: Sep. 30, 1976

Related U.S. Application Data

[63] Continuation of Ser. No. 573,156, Apr. 30, 1975, abandoned.

[30] Foreign Application Priority Data

May 1, 1974 [GB] United Kingdom ............... 19132/74

[51] Int. Cl.² ........................................... H02K 37/00
[52] U.S. Cl. ...................................... 318/696; 310/49
[58] Field of Search .................... 310/49; 318/696, 685

[56] References Cited

U.S. PATENT DOCUMENTS 3,385,984  5/1968  O'Regan ........................... 318/696 X

OTHER PUBLICATIONS

IBM Tech. Disclosure Bulletin; vol. 18, No. 12, 5/76.
IBM Tech. Disclosure Bulletin; vol. 10, No. 8, 1/68.
Radio and Electronic Engineer, vol. 41, No. 7, 7/71, pp. 302-308.

Primary Examiner—Donovan F. Duggan
Attorney, Agent, or Firm—Cushman, Darby & Cushman

[57] ABSTRACT

An electric stepper motor has in addition to the usual driving coils at least one additional coil wound on its stator and connected in a closed circuit. This additional coil damps any oscillations of the rotor. The closed circuit has a resistive value optimized to achieve maximum damping effect. Two or more such additional coils may be connected in a single closed circuit and a number of such closed circuits may be provided.

7 Claims, 4 Drawing Figures

U.S. Patent    July 11, 1978    Sheet 1 of 2    4,100,473

ELECTRIC STEPPER MOTORS

This is a continuation, of application Ser. No. 573,156 filed Apr. 30, 1975, now abandoned.

This invention relates to electric stepper motors.

An electric stepper motor comprises a primary member and a secondary member which move relative to each other. The primary member, usually the stator, is wound with a plurality of drive coils having magnetic axes angularly spaced apart from each other and which are arranged to be energised in a switched sequence. The secondary member, usually the rotor, has one or more magnetically defined axes which are fixed relative to the rotor. As the switching of the current to the drive coils takes place the rotor magnetic axes of the secondary member will tend to align with the magnetic axes of those coils which are energised and thus relative rotation between the primary and secondary members takes place in a manner defined by the switching of the drive coils. The secondary member may have its axes defined by permanent mangetisation or else may have a variable reluctance configuration or the axes may be defined by a combination of both. When the switching of the drive coils is stopped the magnetic field generated thereby will be brought abruptly to a halt and accordingly oscillations will occur in the motion of the rotor about the final stopping position. Also even in conditions of steady running the discontinuous nature of the drive forces causes an oscillatory motion to be superimposed on the rotation of the rotor and this may adversely affect the performance of the motor.

It is an object of the invention to provide a stepper motor in which the magnitude duration and other effects of such oscillations are minimised.

According to the invention an electric stepper motor comprises a primary member wound with a plurality of drive coils having magnetic axes spaced apart from each other annd which are arranged to be energised in a switched sequence and a secondary member having one or more magnetically defined axes and in which the primary and secondary members are arranged for relative movement caused by the switching of the energisation of the drive coils, together with at least one additional coil wound on the primary member and connected in a closed circuit which is provided for the purpose of damping oscillation between the primary and secondary members.

The closed circuit in which an additional coil is connected may include further impedance which may be resistive, inductive or capacitive or a combination thereof and may be of a positive or negative value. The total resistance of the closed circuit is preferably optimised in accordance with a formula set out below and where this total resistance is less than the actual resistance of an additional coil then the closed circuit may include an element which acts as a negative resistance. It may also be desirable to include an inductance or a capacitance in the closed circuit which may have a positive or negative value.

Two or more such additional damping coils may be connected together in series or in parallel with an appropriate value of positive or negative impedance.

It is preferable to provide at least two such additional damping coils spaced apart from each other by 90° electrical as defined by the number of poles in the secondary member but where this is not convenient then the additional coils can be spaced apart by different angles.

Figure 2:
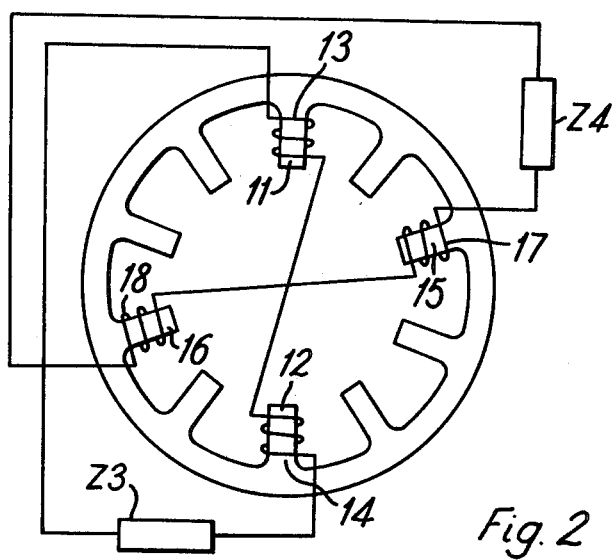
Figure 3:
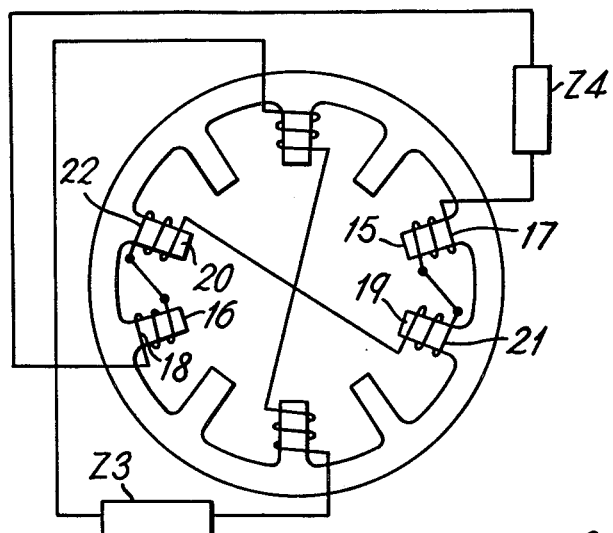
Figure 4:
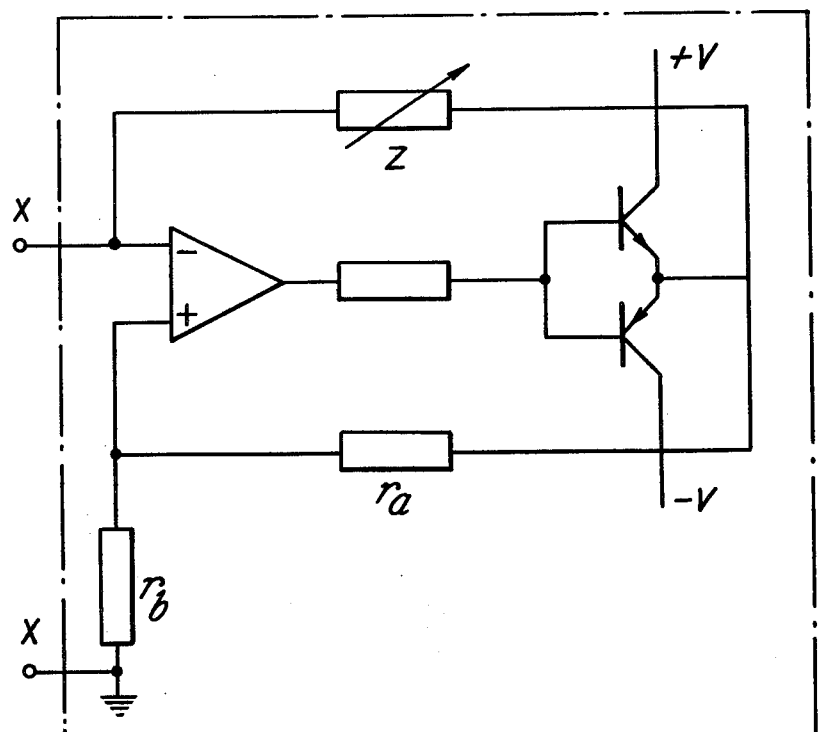

In order that the invention may be more fully understood reference will now be made to the accompanying drawings in which:

FIG. 1 shows diagrammatically a stepper motor having an 8-pole stator and 2 damping coils, FIG. 2 shows a stepper motor having a 10-pole stator and 4 damping coils, FIG. 3 shows a stepper motor having a 10-pole stator and 6 damping coils, and FIG. 4 illustrates a circuit suitable for providing negative impedance.

Referring now to FIG. 1 there is shown therein an electric stepper motor having a stator member 1 providing 8 poles spaced apart equi-angularly around the circumference. Each such pole defines a magnetic axis and the poles are wound with individual drive coils (not shown) connected to a suitable switching arrangement. The drive coils are energised in a sequence so that at each switching step a magnetic field having defined axes is generated. The switching of the stator drive coils causes these axes to be stepped round relative to the stator member. A suitable rotor (not shown) is also provided which has 2 or more poles. These poles may be defined by permanent magnets or by energised windings or else the rotor may be shaped so that its reluctance is different at different angular positions round its periphery. Yet again the rotor may include a combination of permanent magnet and reluctance effects. As the engisation of the drive coils is switched the rotor will step round so that its magnetic axes align with the instantaneous position of the stator magnetic fields.

In addition to the usual features of a stepper motor described above two of the stator poles 2 and 3 which in the case of a 2 pole rotor are spaced apart 90° mechanical from each other are provided with damper coils 4 and 5 which are additional to the drive coils. Coils 4 and 5 are connected in closed circuits which include impedances Z1 and Z2, normally of equal value. The values of Z1 and Z2 are chosen so that the total resistive components of each closed circuit ($r_{opt}$) including the resistance of the coil 4 or 5 give the optimum form of oscillatory response. This value will lie in the range:

$$1.25\omega_n L < r_{opt} < 2.5\omega_n L$$

where $\omega_n$ = natural frequency of rotor and load oscillating in the field of a drive coil and L = self inductance of a damper coil While in FIG. 1 two additional coils are shown angularly displaced by 90° mechanical it may be sufficient in certain circumstances to provide only one such coil.

In place of any one additional coil a pair of additional coils may be provided at diametrically opposite poles. The direction of current flow through any such pair of additional coils is such that their m.m.f's are additive. Two such pairs of additional coils on diametrically opposite poles may be provided angularly displaced with respect to each other. A diametrically opposed pair of coils can be connected in series in the appropriate sense in which case the overall resistance of the series circuit is given by $2r_{opt}$.

A 10-pole stator machine embodying the invention is shown in FIG. 2. Where the machine has a 2-pole rotor and in certain other cases it is not possible to select stator poles which are displaced by 90° electrical with respect to each other, but instead poles are selected which are near to 90° electrical. With a 10 stator pole machine with a 2-pole rotor an angular displacement of 72° is chosen. For the arrangement shown in FIG. 2 a pair of poles 11 and 12 diametrically opposite to each other have wound on them damping coils 13 and 14 which are additional to drive coils wound on every pole. Coils 13 and 14 are connected in series with each other in a sense so that their m.m.f's are additive and the series circuit is completed by an impedance Z3 of a value preferably chosen so that the total resistance of the circuit comprising Z3 and the coils 13 and 14 is given by $2r_{opt}$.

In addition a pair of diametrically opposite poles 15 and 16 are chosen displaced from poles 11 and 12 by 72° and these poles have wound on them additional coils 17 and 18 connected in series and the series circuit is completed by an impedance Z4 with resistive component preferably of value $2r_{opt}$ (assuming that coils 17 and 18 have the same resistance as coils 13 and 14).

If it is desired to provide a 90° displacement between the axes of damping coils with a motor in which no two polar axes are displaced by 90° electrical then an arrangement of the kind shown in FIG. 3 can be used which also refers to a 10-pole stator motor and in which like parts have like reference numerals to FIG. 2. In the FIG. 3 arrangement poles 19 and 20 adjacent to poles 15 and 16 are also selected and have wound on them additional coils 21 and 22. The four coils 17, 18, 21 and 22 are connected in series with each other and the circuit is completed by an impedance Z4. The value of the resistive component of Z4 is preferably chosen so that (assuming all the coils have the same resistance) the total resistance of the series circuit comprising impedance Z4 and coils 17, 21, 22 and 18 is substantially $4r_{opt}$. It will be seen that the resultant m.m.f. of the four coils 17, 18, 21 and 22 is at right angles to the m.m.f. of the pair of coils 13 and 14.

In general where $n$ coils are connected in series then the overall resistance of the series circuit should preferably be $nr_{opt}$ and if such coils are electrically connected in parallel then the value of the overall resistance of the circuit should preferably be $r_{opt}/n$.

In some cases it may be found that the resistance of an additional coil is greater than $r_{opt}$ in which case the series impedance to be included in the circuit must have a resistive component with a negative value. A suitable circuit providing a negative impedance is shown in FIG. 4 $r_a = r_b$, the impedance between the terminals XX is given by minus Z. If the impedance Z in FIG. 4 is purely resistive a negative resistance is obtained between the terminals XX'.

It may be desirable to include a variable resistor in a circuit to control the damping and compensate for temperature variations of resistance in the coils and components. In addition to provide temperature compensation the resistance component of the impedance Z in the negative impedance circuit of FIG. 4, may be mounted on the motor itself so as to ensure that its value always changes in the same way as the resistance of the actual damping coil.

While in the various figures the windings have been illustrated as applicable to a 2-pole rotor it will be appreciated that with appropriate modifications the invention can be applied to a motor having a rotor of any pole number, and rotor/stator configurations which provide for vernier motor operation are also included.

We claim:

1. An electric stepper motor comprising a primary member having a plurality of spaced magnetic poles each wound with a drive coil, said magnetic poles being arranged to be energised in sequence, and a secondary member having at least two magnetic poles, the primary and secondary members being arranged for relative movement caused by switching of the energisation of the drive coils, said motor further comprising at least one coil additional to the drive coils and wound on the primary member, said additional coil being independent of a connection to an external source of voltage which would cause continuous energisation thereof and being connected with an impedance having a resistance component in a closed circuit to dampen oscillation between the primary and secondary members.

2. The stepper motor as claimed in claim 1 in which the resistance component has the value $r_{opt}$, where $r_{opt}$ lies between $$1.25\omega nL \text{ and } 2.5\omega nL$$

where $\omega n$ = natural frequency of rotor and load oscillating in the field of a drive coil and L = self inductance of said dampening coil.

3. The stepper motor as claimed in claim 2 in which $r_{opt}$ is less than the actual resistance of said dampening coil and the closed circuit includes an element which acts as a negative resistance.

4. The stepper motor as claimed in claim 1 in which the said impedance also includes a reactive component.

5. The stepper motor as claimed in claim 1 in which two additional damping coils are provided.

6. The stepper motor as claimed in claim 5 in which the two additional damping coils are electrically spaced apart from each other by 90°.

7. The stepper motor as claimed in claim 1 comprising two closed circuits in each of which is connected at least one additional coil.

* * * * *